(12) United States Patent
Zhou et al.

(10) Patent No.: US 11,796,310 B1
(45) Date of Patent: Oct. 24, 2023

(54) FIBER BRAGG GRATING DISPLACEMENT SENSOR WITH POSITIVE AND NEGATIVE BIDIRECTIONAL MEASUREMENT AND FREE FROM VIBRATION

(71) Applicant: University of Macau, Macau (CN)

(72) Inventors: Wanhuan Zhou, Macau (CN); Yongxing Guo, Macau (CN); Li Xiong, Macau (CN)

(73) Assignee: University of Macau, Macau (CN)

( * ) Notice: Subject to any disclaimer, the term of this patent is extended or adjusted under 35 U.S.C. 154(b) by 0 days.

(21) Appl. No.: 17/969,212

(22) Filed: Oct. 19, 2022

(30) Foreign Application Priority Data

Jun. 10, 2022 (CN) .......................... 202210655360.X

(51) Int. Cl.
*G01B 11/16* (2006.01)
*G01L 1/24* (2006.01)

(52) U.S. Cl.
CPC ............ *G01B 11/165* (2013.01); *G01L 1/246* (2013.01)

(58) Field of Classification Search
CPC ........ G01B 11/02; G01B 11/165; G01L 1/246
See application file for complete search history.

(56) References Cited

U.S. PATENT DOCUMENTS 10,663,324 B2 * 5/2020 Wakahara ................ G01L 1/246
10,830,944 B2 * 11/2020 Wakahara ........... G01D 5/35316

FOREIGN PATENT DOCUMENTS

| CN | 101526339 A | * | 9/2009 | |
|---|---|---|---|---|
| CN | 102072787 A | * | 5/2011 | |
| CN | 201844820 U | | 5/2011 | |
| CN | 202614433 U | * | 12/2012 | |
| CN | 203100683 U | | 7/2013 | |
| CN | 203432538 U | * | 2/2014 | |
| CN | 203908504 U | * | 10/2014 | |
| CN | 107131833 A | | 9/2017 | |
| CN | 207540500 U | * | 6/2018 | |
| CN | 110986794 A | | 4/2020 | |
| CN | 111006606 A | * | 4/2020 | ........... G01B 11/165 |
| CN | 112229345 A | | 1/2021 | |
| CN | 213543471 U | | 6/2021 | |
| CN | 214095927 U | * | 8/2021 | |
| DE | 19922102 B4 | * | 5/2004 | ............. G01B 11/18 |

* cited by examiner

*Primary Examiner* — Octavia Davis Hollington
(74) *Attorney, Agent, or Firm* — Nitin Kaushik

(57) ABSTRACT

The present disclosure discloses a fiber Bragg grating displacement sensor with positive and negative bidirectional measurement and free from vibration, which falls within the technical fields of fiber sensing and measurement monitoring, and aims to solve the problem that the measuring range of the existing fiber Bragg grating displacement sensor is positive, and the free end of the cantilever beam will generate vibration deformation, resulting in inaccurate displacement measurement. The sensor of the present disclosure has a positive and negative two-way displacement measurement range through the arrangement of a bidirectional measuring mechanism. In the measurement process, the cantilever beam of the vibration-avoiding mechanism is in an initial state of zero deformation, resulting in upper and lower bending deformation, so as to avoid the fatigue and failure problems caused by the cantilever beam and the fiber Bragg grating due to constant force.

7 Claims, 8 Drawing Sheets

FIBER BRAGG GRATING DISPLACEMENT SENSOR WITH POSITIVE AND NEGATIVE BIDIRECTIONAL MEASUREMENT AND FREE FROM VIBRATION

CROSS-REFERENCE TO RELATED APPLICATIONS

The application claims priority to Chinese patent application No. 202210655360X, filed on Jun. 13, 2022, the entire contents of which are incorporated herein by reference.

TECHNICAL FIELD

The present disclosure relates to the field of fiber sensing technology and measurement monitoring technology, and particularly to a fiber Bragg grating displacement sensor with positive and negative bidirectional measurement and free from vibration.

BACKGROUND

Displacement, crack and other deformation information monitoring plays a vital role in many major civil engineering, structural engineering, mechanical equipment service state, safety assessment and maintenance, such as deformation state of bridge body, operation displacement of large mechanical equipment, structural crack changes and other key safety information monitoring, so displacement sensors play an important role in structural safety and health monitoring. The traditional displacement sensor based on weak electric and magnetic signals has a signal that is vulnerable to the interference of electromagnetic environment (such as lightning strike, electromechanical equipment electromagnetic field), and the sensor signal is unstable, which is not conducive to long-term real-time monitoring, especially in the poor adaptability and durability of the field harsh environment. Fiber Bragg Grating (FBG) is based on light as the sensing signal without electromagnetic interference, and the material of FBG elements is glass, which has stable physical properties and good durability. Therefore, the displacement sensor technology based on the principle of fiber Bragg grating gets much attention. The existing fiber Bragg grating displacement sensors generally use a cantilever beam as an elastic element, and the fiber Bragg grating is pasted on the surface of the cantilever beam. External displacement, directly or through a mechanical mechanism, causes the bending or deformation of the cantilever beam. The fiber Bragg grating senses the strain on the surface of the cantilever beam and produces a wavelength shift, and after calibration, the corresponding relationship between the external displacement and the wavelength shift is obtained.

However, the existing fiber Bragg grating displacement sensor has the following technical problems: the measuring range of the sensor is positive (for example, 0-100 mm). For example, with reference to the Chinese patent "fiber Bragg grating displacement sensor" with the application number of 201821395267.5, and the document "Fiber Bragg Grating Displacement Sensor with High Abrasion Resistance for a Steel Spring Floating Slab Damping Track", the journal Sensors, Vol. 18, No. 6, 2018, if the deformation displacement of the measured object is reciprocating, then the state of the sensor needs to be set to a displacement value (for example, 50 mm) first, and the reciprocating deformation displacement around the value of 50 mm can be measured after installation and fixation on the measured object. In this case, the initial state of the fiber Bragg grating sensor is set to 50 mm, and the cantilever beam element and fiber Bragg grating element of the sensor are exposed to the positive and negative alternating stress-strain near the large load (50 mm) for a long time, instead of being exposed to the positive and negative alternating stress-strain near the no load (0 mm). This long-term positive stress state will accelerate the cantilever beam metal matrix and fiber Bragg grating to reach the fatigue limit, accelerate their stress relaxation and creep, and make the cantilever beam elastic matrix and fiber Bragg grating of the sensor fail in advance, which is not conducive to long-term monitoring. In addition, the existing fiber Bragg grating displacement sensors (such as "gear mechanical linkage fiber Bragg grating displacement sensor" in Chinese patent application No. 202120240121.9, and "symmetrical large-range fiber Bragg grating displacement sensor" in Chinese patent application No. 201921684738.9) may generate vibration deformation at the free end of the cantilever beam in the case of vibration impact, and this deformation may also cause the wavelength shift of the fiber Bragg grating to cross-couple with the wavelength shift caused by the displacement, resulting in inaccurate displacement measurement. The foregoing technical problem needs to be solved urgently, and therefore, the present disclosure provides a Fiber Bragg grating displacement sensor with positive and negative bidirectional measurement and free from vibration.

SUMMARY

In view of the problems existing in the prior art, the present disclosure discloses a fiber Bragg grating displacement sensor with positive and negative bidirectional measurement and free from vibration, and the technical solution adopted thereby is comprising: a cover plate, a base, a sleeve, a bidirectional measuring mechanism, a vibration-avoiding mechanism, a linear guide rail, a linear slider, a first fiber Bragg grating (FBG1), a compensation strip and a second fiber Bragg grating (FBG2), the cover plate being provided on a front side of the base, the sleeve being provided on a left side of the base, the sleeve being used for mounting a screw to lock the bidirectional measuring mechanism, the bidirectional measuring mechanism being slidably connected in the base, the bidirectional measuring mechanism can realize positive and negative bidirectional displacement measurement, a linear guide rail being provided inside the base, the linear slider being provided on the linear guide rail, the bidirectional measuring mechanism being connected to the linear slider. By means of the arrangement of a linear guide rail and a linear slider, a guiding function can be achieved. The vibration-avoiding mechanism is arranged in the interior of the base above the linear guide rail, and by means of the arrangement of the vibration-avoiding mechanism, the function of connecting and transmitting deformation can be achieved, vibration deformation can be avoided and the measurement accuracy of displacement can be ensured. A first fiber Bragg grating (FBG1) is pasted on an upper surface of the vibration-avoiding mechanism, and by means of the arrangement of the first fiber Bragg grating (FBG1), a bending strain of the cantilever beam can be sensed. A compensation strip is fixedly connected to a left side of the inner top wall of the base. A second fiber Bragg grating (FBG2) is pasted on a lower surface of the compensation strip, and temperature compensation can be provided for the first fiber Bragg grating (FBG1) by the arrangement of the second fiber Bragg grating (FBG2).

Further, characterized in that the bidirectional measuring mechanism (16) comprises a transmission rod (4), a spring (5), a pin (6) and a guider (7), the transmission rod (4) being provided inside the base (2), the transmission rod (4) passing through the sleeve (3), the pin (6) being connected to a left end of the transmission rod (4), the spring (5) being provided on an outer surface of the transmission rod (4) on a right side of the pin (6), and the guider (7) being connected to a right end of the transmission rod (4) inside the base (2). By providing the bidirectional measuring mechanism, positive and negative bidirectional displacement measurement can be realized.

Further, characterized in that the vibration-avoiding mechanism (17) comprises a cantilever beam(10), a transmission screw (11) and a steel ball(12), the cantilever beam(10) being fixedly connected to an inner wall, above the linear guide rail (8), of the base (2), the transmission screw (11) being provided at one end of the cantilever beam (10), and a steel ball (12) being connected to a tail end, inside the guider (7), of the transmission screw (11). Through the arrangement of cantilever beam, transmission screw and steel ball, connecting and transmitting deformation can be achieved, so as to avoid vibration deformation and ensure the measurement accuracy of displacement.

Further, characterized in that the cover plate (1) is in a rectangular plate shape, two rows of through holes are arranged in parallel on the front side of the cover plate (1), and each row of through holes consists of three through holes at equal intervals, the base (2) being in a shape of a rectangular box without a cover, a sleeve screw hole (201) being provided on a left side face of the base (2), a first boss (202), a second boss (203) and a third boss (204) being provided on an inner wall of the base (2), two screw holes being provided on the first boss (202), seven screw holes being provided on the second boss (203) at equal intervals, a first fiber outlet screw hole (205), a second fiber outlet screw hole (206) and two cantilever beam fixing through holes (207) being provided on a right side face ofthe base (2), the front side of the base (2) being provided with a through hole at a position corresponding to a position of the through hole on the front side of the cover plate (1); the sleeve (3) being a cylindrical structure with a shoulder, a right side of the sleeve (3) being in threaded connection with the sleeve screw hole (201), and the surface of the sleeve (3) being provided with a fastening screw hole (301). The cover plate and the base are detachably connected, two ends of the fiber are led out through a first fiber outlet screw hole and a second fiber outlet screw hole, and a screw is screwed into a fastening screw hole so as to fix the transmission rod.

Further, characterized in that the transmission rod (4) is of a rod-shaped structure, a left side of the transmission rod (4) being provided with an internal thread, and a right side of the transmission rod (4) being provided with an external thread, the spring (5) being sheathed on the transmission rod (4), a right side of the spring (5) abutting a left side of the sleeve (3), the pin (6) having a conical structure, a left side of the pin (6) having a spherical shape, the pin (6) being in threaded connection with the transmission rod (4), and a right side of the pin (6) abutting a left side of the spring (5). A pin limits a left side of the spring, making it easier to disassemble the pin and the spring.

Further, characterized in that the guider (7) is of a wedge-shaped structure, a circular slide groove (701), four guider fixing through holes 1702) and a transmission rod fixing screw hole (703) being provided inside the guider (7), the circular slide groove (701) being provided in an inclined manner, the transmission rod (4) being in a threaded connection with the transmission rod fixing screw hole (703) via the external thread on the right side, the linear guide rail (8) being in a shape of an elongated strip, a through hole corresponding to seven screw holes on the second boss (203) being provided on the linear guide rail (8), and the linear guide rail (8) being fixed on the second boss (203) via a screw. A circular slide groove limits a steel ball, a guider is fixed via four guider fixing through holes, and a transmission rod fixing screw hole connects the guider with the transmission rod.

Further, characterized in that the linear slider (9) comprises a first linear slider (901) and a second linear slider (902) with same structure slidingly connected on the linear guide rail (8), surfaces of the first linear slider (901) and second linear slider (902) being both provided with two screw holes, positions of the screw holes corresponding to positions of four guider fixing through holes (702), the guider (7) being fixed on the linear slider (9) by means of a screw, a left side of the cantilever beam (10) being provided with an end screw hole (1001), a right side of the cantilever beam (10) being provided with two root screw holes (1002), the right side of the cantilever beam (10) being partially placed on the third boss (204), positions of the two root screw holes (1002) corresponding to positions of the two cantilever beam fixing through holes (207), and the cantilever beam (10) being fixed in the base (2) by two screws. The cantilever beams are mounted through the screw holes on root portions and the transmission screws 11 are mounted in the screw holes at ends.

Further, characterized in that the transmission screw (11) is in threaded connection with the end screw hole (1001), the steel ball(12) being a round ball with a smooth surface, a screw hole being provided on a surface of the steel ball (12), the steel ball (12) being in threaded connection with the transmission screw (11) via the screw hole, the steel ball (12) being embedded in the circular slide groove (701), and the steel ball (12) being slidably connected with the circular slide groove (701). The steel ball fits seamlessly with the circular slide groove and slides freely.

Further, characterized in that the compensation strip (14) is provided witha through hole at a position corresponding to the positions of two screw holes on the first boss (202), and the compensation strip (14) is fixedly connected to the first boss (202) via two screws, the first fiber Bragg grating (13) and the second fiber Bragg grating (15) being connected in series with the same fiber, and two ends of the fiber respectively exiting through a first fiber outlet screw hole (205) and a second fiber outlet screw hole (206). The compensation strip is secured to a first boss.

Advantageous effects of the invention are as follows. Compared with the existing fiber Bragg grating displacement sensor, the sensor of the present disclosure has a positive and negative bidirectional displacement measurement range, and in the measurement process, the cantilever beam is in an initial state of zero deformation, resulting in bending deformation upside down, avoiding the bending deformation of the cantilever beam element and the fiber Bragg grating element in a long-term load state, thereby avoiding the fatigue and failure problems of the cantilever beam and the fiber Bragg grating due to the constant force. The present disclosure enables the free end of the cantilever beam to be restricted by assembling a steel ball at the free end of the cantilever beam and inserting the steel ball into the circular slide groove of the guider, so that if there is impact vibration in the working environment, the restricted cantilever beam will not generate vibration deformation, ensuring the measurement accuracy of displacement, and also widening the application field of the sensor, so that it is also applicable in the environment where vibration exists.

DETAILED DESCRIPTION OF THE EMBODIMENTS

Embodiment 1

Figure 1:
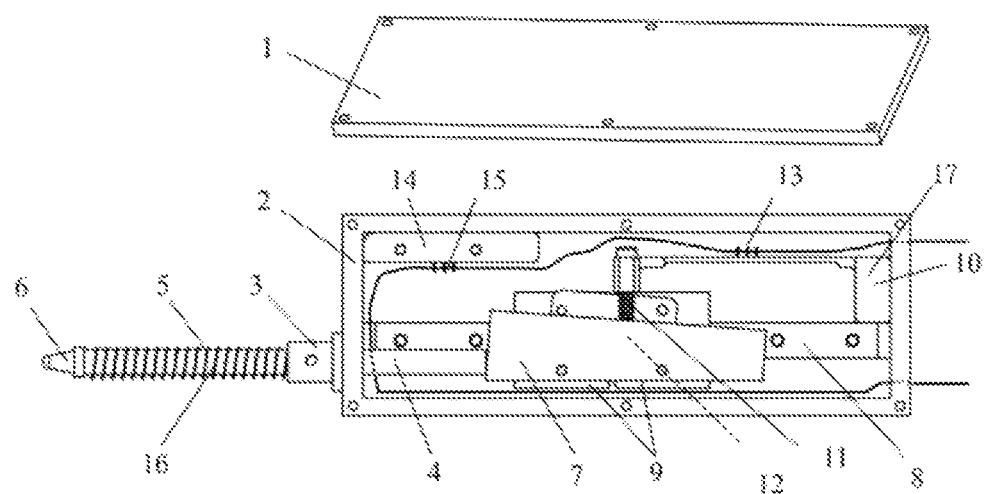
FIG. 1 is a schematic view showing an overall structure of the present disclosure.
Figure 2:
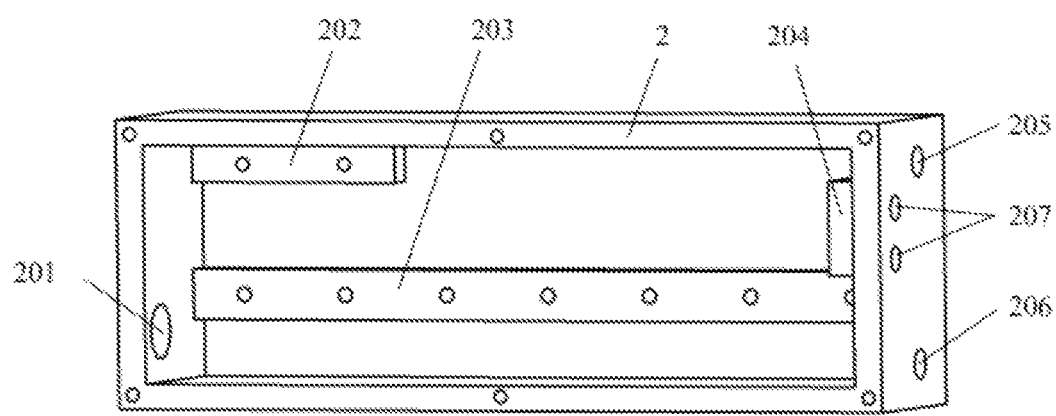
FIG. 2 is a schematic view showing an inner structure of a base according to the present disclosure.
Figure 3:
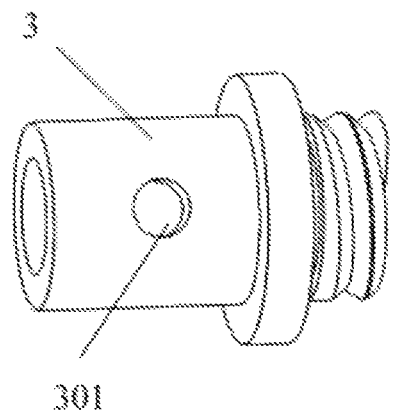
FIG. 3 is a perspective structural view of a sleeve according to the present disclosure.
Figure 4:
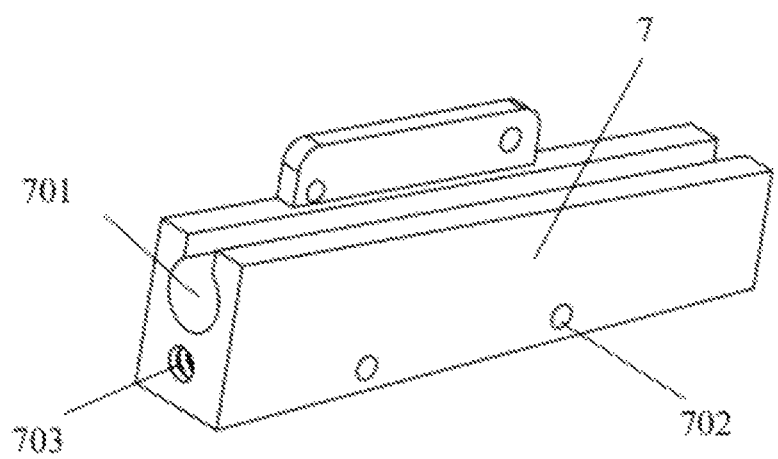
FIG. 4 is a perspective structural view illustrating a guider according to the present disclosure.
Figure 5:
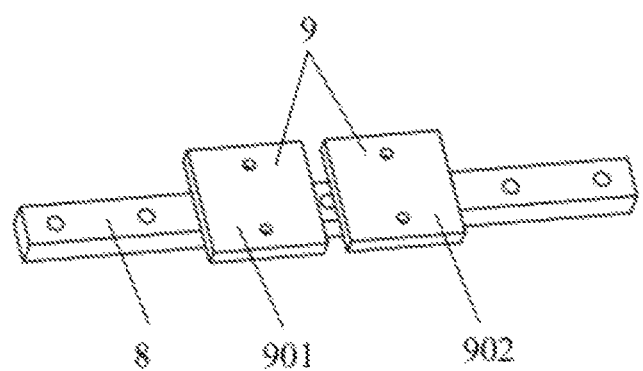
FIG. 5 is a schematic view showing the assembly of a linear guide rail and a linear slider according to the present disclosure.
Figure 6:
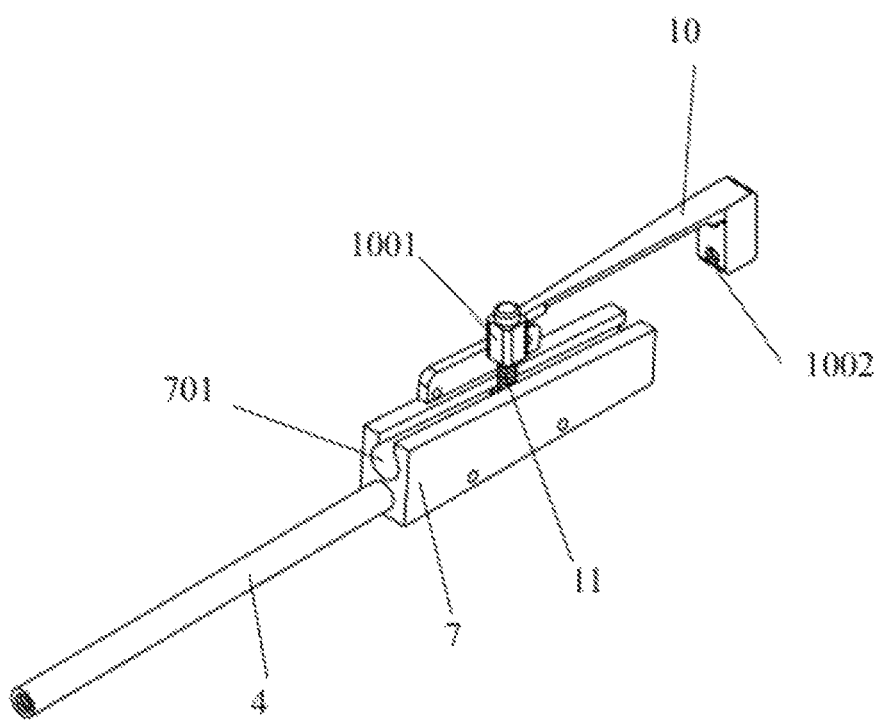
FIG. 6 is a schematic view showing the assembly of a transmission rod, a guider, a cantilever beam, a transmission screw and a steel ball of the present disclosure.
Figure 7:
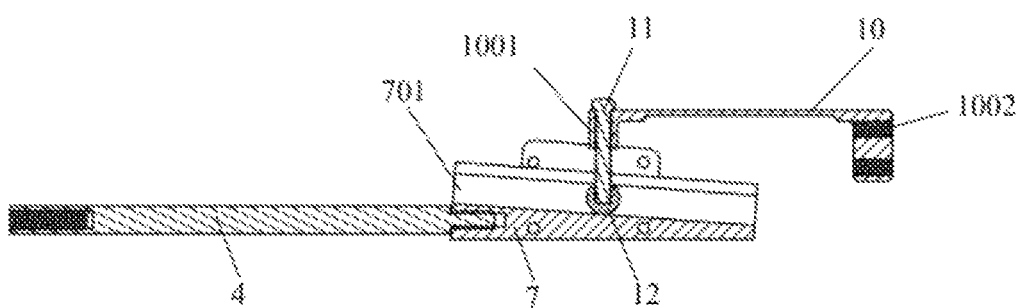
FIG. 7 is a cross-sectional view showing the assembly of a transmission rod, a guider, a cantilever beam, a transmission screw and a steel ball of the present disclosure.

As shown in FIGS. 1-8, the present disclosure discloses a Fiber Bragg grating displacement sensor with positive and negative bidirectional measurement and free from vibration, and the technical solution adopted thereby comprises: a cover plate 1, a base 2, a sleeve 3, a bidirectional measuring mechanism 16, a vibration-avoiding mechanism 17, a linear guide rail 8, a linear slider 9, a first fiber Bragg grating (FBG1) 13, a compensation strip 14 and a second fiber Bragg grating (FBG2) 15, the cover plate 1 being provided on a front side of the base 2, the sleeve 3 being provided on a left side of the base 2, a screw being mounted in the sleeve 3 to lock the bidirectional measuring mechanism 16, the bidirectional measuring mechanism 16 being slidably connected in the base 2, the bidirectional measuring mechanism 16 performing positive and negative bidirectional displacement measurement, and the linear guide rail 8 being provided inside the base 2, the linear guide rail 8 being provided with the linear slider 9, the linear guide rail 8 and the linear slider 9 guiding displacement of a bidirectional measuring mechanism 16, the bidirectional measuring mechanism 16 being connected to the linear slider 9, an inside of the base 2 being provided, above the linear guide rail 8, with a vibration-avoiding mechanism 17, the vibration-avoiding mechanism 17 preventing vibration deformation during measurement and improving measurement accuracy, the first fiber Bragg grating (FBG1) 13 being pasted on an upper surface of the vibration-avoiding mechanism 17, the first fiber Bragg grating (FBG1) 13 being used for sensing ta bending strain of the cantilever beam 10, the compensation strip 14 being fixedly connected to a left side of an inner top wall of the base 2, the second fiber Bragg grating (FBG2) 15 being pasted on a lower surface of the compensation strip 14, and the second fiber Bragg grating (FBG2) 15 providing a temperature compensation for the first fiber Bragg grating (FBG1) 13. A cover plate 1, a base 2, a sleeve 3, a transmission rod 4, a spring 5, a pin 6, a guider 7, a linear guide rail 8, a linear slider 9, a cantilever beam 10, a transmission screw 11, a steel ball 12, a first fiber Braggg rating (FBG1) 13, a compensation strip 14 and a second fiber Bragg grating (FBG2) 15, a front side of the base 2 being provided with the cover plate 1, an interior of the base 2 being provided with the transmission rod 4, a left side of the base 2 being provided with a sleeve 3 for mounting a screw to lock the transmission rod 4, the transmission rod 4 passing through the sleeve 3, a left end of the transmission rod 4 being connected to the pin6, the pin 6 being used for contacting a measured object and limiting the spring 5, a right side of the pin 6 being provided with a spring 5 on an outer surface of the transmission rod 4, the spring 5 reseting the pin 6, the transmission rod 4 and the guider 7, an inside of the base 2 being connected to the guider 7 at a right end of the transmission rod 4, a linear guide rail 8 being connected between inner side walls of the base 2, a linear slider 9 being provided on the linear guide rail8, the linear guide rail8 and the linear slider 9 playing a guiding role, and the cantilever beam 10 being fixedly connected to the inner wall of the base 2 above the linear guide rail 8, one end of the cantilever beam 10 being provided with a transmission screw 11, a tail end of the transmission screw 11 being located in the guider 7 and connected to a steel ball 12, the cantilever beam 10 and the transmission screw 11 and the steel ball 12 functioning to connect and transmit deformation, an upper surface of the cantilever beam being pasted with a first fiber Bragg grating (FBG1) 13, the first fiber Bragg grating (FBG1) 13 being used for sensing a bending strain ofthe cantilever beam 10, a compensation strip 14 being fixedly connected to a left side of the inner top wall of the base 2, and a lower surface ofthe compensation strip 14 being pasted with a second fiber Bragg grating (FBG2)15, the second fiber Bragg grating (FBG2) 15 providing temperature compensation for the first fiber Bragg grating (FBG1) 13.

As a preferred technical solution of the present disclosure, the bidirectional measuring mechanism 16 comprises a transmission rod 4, a spring 5, a pin 6 and a guider 7, the transmission rod 4 being provided inside the base 2, the transmission rod 4 passing through the sleeve 3, a pin 6 being connected to a left end of the transmission rod 4, a spring being provided on an outer surface of the transmission rod 4 on a right side of the pin 6, a guider 7 being connected to a right end of the transmission rod 4 inside the base 2, the pin 6 being used for contacting an object to be measured object and limiting the spring 5, the spring 5 reseting the pin6, the transmission rod 4 and the guider 7, and the transmission rod 4 and the guider 7 being displaced in both positive and negative directions.

As a preferred technical solution of the present disclosure, the vibration-avoiding mechanism 17 comprises a cantilever beam 10, a transmission screw 11 and a steel ball 12, the cantilever beam 10 being fixedly connected with the inner wall of the base 2 above the linear guide rail 8, one end of the cantilever beam 10 being provided with the transmission screw 11, a tail end of the transmission screw 11 being connected with the steel ball 12 in the guider 7, the cantilever beam 10, the transmission screw 11 and the steel ball 12 functioning to connect and transmit deformation so as to avoid vibration deformation.

As a preferred technical solution of the present disclosure, the cover plate 1 has a rectangular plate shape, and two rows of through holes are arranged in parallel on the front side of the cover plate 1, wherein each row of through holes is composed of three through holes at equal intervals. The base 2 is in the shape of a rectangular box without a cover, a sleeve screw hole 201 is provided on a left side face of the base 2, a first boss 202, a second boss 203 and a third boss 204 are provided on an inner wall of the base 2, and two screw holes are provided on the first boss 202. Seven screw holes are provided on the second boss 203 at equal intervals, a first fiber outlet screw hole 205, a second fiber outlet screw hole 206 and two cantilever beam fixing through holes 207 are provided on a right side face of the base 2, and a through hole at a position corresponding to the position of the through hole on the front side of the cover plate 1 is provided on a front side of the base 2. The sleeve 3 is a cylindrical structure with a shoulder, a right side of the sleeve 3 is in threaded connection with a sleeve screw hole 201, a fixing screw hole 301 is provided on the surface of the sleeve 3, and the through holes of the cover plate 1 and the base 2 are connected via a screw. A first fiber outlet screw hole 205 and a second fiber outlet screw hole 206 are used for leading out two ends of an fiber, and the transmission rod 4 can be fixed by screwing the screw into the fixing screw hole 301.

As a preferred technical solution of the present disclosure, the transmission rod 4 has a rod-shaped structure, a left side of the transmission rod 4 is provided with an internal thread, and a right side of the transmission rod 4 is provided with an external thread. The spring 5 is sheathed on the transmission rod4, and a right side of the spring 5 abuts a left side of the sleeve 3. The pin6 has a conical structure, a left side of the pin 6 has a spherical shape, the pin 6 is in a threaded connection with the transmission rod 4, and a right side of the pin 6 abuts a left side of the spring 5. The pin 6 limits a left side of the spring 5, and at the same time, the pin 6 and the spring 5 are conveniently disassembled.

As a preferred technical solution of the present disclosure, the guider 7 is of a wedge-shaped structure, and an interior of the guider 7 is provided with a circular slide groove 701, four guider fixing through holes 702 and a transmission rod fixing screw hole 703. The circular slide groove 701 is provided in an inclined manner, and the transmission rod 4 is in a threaded connection with the transmission rod fixing screw hole 703 via an external thread on the right side. The linear guide rail 8 is in the shape of an elongated strip, through holes corresponding to seven screw holes on the second boss 203 are provided on the linear guide rail 8, and the linear guide rail 8 is fixed on the second boss 203 via a screw. A circular slide groove 701 limits the steel ball 12, four guider fixing through holes 702 are used for fixing the guider 7, and a transmission rod fixing screw hole 703 is used for connecting the transmission rod 4.

As a preferred technical solution of the present disclosure, the linear slider 9 comprises a first linear slider 901 and a second linear slider 902 with the same structure slidingly connected to a linear guide rail 8. The surfaces of the first linear slider 901 and second linear slider 902 are both provided with two threaded holes on surface, the positions of the threaded holes correspond to the positions of four of the guider fixing through holes 702, and the guider 7 is fixed on the linear slider 9 by means of a screw. A left side of the cantilever beam10 is provided with an end screw hole 1001, and a right side of the cantilever beam 10 is provided with two root screw holes 1002. The right side of the cantilever beam is partially placed on the third boss 204, and the two root screw holes 1002 correspond to the positions of the two cantilever beam fixing through holes 207. The cantilever beam 10 is fixed in the base 2 by two screws, the root screw holes 1002 are used for mounting the cantilever beam 10, and the end screw holes 1001 are used for mounting the transmission screws 11.

As a preferred embodiment of the present disclosure, the transmission screw 11 is threadedly connected to the end screw hole 1001. The steel ball 12 is a round ball with a smooth surface, a screw hole is provided on the surface of the steel ball 12, and the steel ball 12 is in a threaded connection with the transmission screw 11 via the screw hole. The steel ball 12 is embedded in the circular slide groove 701, the steel ball 12 is in a sliding connection with the circular slide groove 701, and the steel ball 12 and the circular slide groove 701 are matched seamlessly and can slide freely.

As a preferred technical solution of the present disclosure, the compensation strip 14 is provided with through holes corresponding to the positions of two screw holes on the first boss 202, and the compensation strip 14 is fixedly connected to the first boss 202 via two screws. The first fiber Bragg grating (FBG1) 13 and the second fiber Bragg grating (FBG2) are connected in series with the same fiber, two ends of the fiber respectively exit through a first fiber outlet screw hole 205 and a second fiber outlet screw hole 206, and a first boss 202 is used for fixing the compensation strip 14.

Principles of Operation of the Invention: When assembling the sensor, firstly, the coating layer of the gate region part of the first fiber Bragg grating (FBG1) 13 is peeled off, and the epoxy resin glue is used to paste and fix same on the upper surface of the cantilever beam 10 as a bending strain measurement grating. The coating layer of the gate region part of the second fiber Bragg grating (FBG2) 15 is peeled off, and the epoxy resin glue is used to paste and fix same on a lower surface of the compensation strip 14. The second fiber Bragg grating (FBG2) 15 only senses the ambient temperature and the thermal expansion and contraction of the compensation strip 14 caused by the change in the temperature environment as a temperature compensation grating. Secondly, tail fibers at two ends of two fiber Bragg gratings are respectively led out from a first fiber outlet screw hole 205 and a second fiber outlet screw hole 206 on the right side surface of the base 2. A transmission screw 11 is screwed into and tightened from a screw hole 1001 at an end of a cantilever beam 10. A steel ball 12 is screwed onto the tail end of the transmission screw 11, the steel ball 12 is embedded into the circular slide groove 701 of the guider 7 and the sliding of the steel ball 12 is ensured to be smooth. The guider 7 is fixed on a linear slider 9 via four screws, the linear slider 9 is assembled on a linear guide rail 8, and the linear guide rail 8 is fixed on a second boss 203 on the bottom surface of the base 2 via seven screws. The cantilever beam is placed on the third boss 204, two screws are used to pass through two cantilever beam fixing through holes 207 and screwed on two root screw holes 1002 of the cantilever beam so as to fix the cantilever beam 10. Then one end with an external thread on the right side of the transmission rod 4 penetrates through the sleeve screw hole 201 of the base 2 and is then screwed in the transmission rod fixing screw hole 703 of the guider 7. Then the sleeve 3 is sleeved on the transmission rod, and screwed on the sleeve screw hole 201 of the base 2. Then the spring 5 is sleeved on the transmission rod 4, with one end abutting against the sleeve 3, and after the spring 5 is manually compressed, the external threads on the right side of the pin 6 are screwed into the internal screw holes on the left side of the transmission rod 4 to achieve the fixation, while the spring 5 is constrained, and finally the cover plate 1 is fixed on the two rows of screw holes on the top surface of the base 2 via six screws to achieve the completion of the assembly of the sensor.

When the sensor is in the zero state without displacement measurement, the cantilever beam 10 is free from bending deformation and is free from any stress strain, and the steel ball 12 is located at the middle of the length of the circular slide groove 701. The transmission rod 4 passes through the sleeve 3, and a fastening screw abutting against the transmission rod 4 is screwed on the fastening screw hole 301, so that the transmission rod 4 can be locked to not move, and the sensor is locked in a zero state of no-displacement measurement. When the sensor is in a working state, the pin 6 is in contact with the object to be measured. The tightening screw on the fastening screw hole 301 is unscrewed, the spring is in a compressed state, and the elastic force can drive the pin 6 to move to the left, then the transmission rod 4 and the guider 7 to move to the left until a left side of the guider 7 abuts against the left side inner wall of the base 2, and this leftward movement is a positive displacement. When the pin 6 moves to the right, the spring 5 can also continue to compress, and then drives the transmission rod 4 and the guider 7 to move to the right, until the right side of the guider 7 abuts against an inner wall of the right side of the base 2, and this movement to the right is a negative displacement. When the displacement of the measured object is a forward displacement to the left, the pin 6, the transmission rod 4 and the guider 7 synchronously move forward to the left, and the circular slide groove 701 of the guider 7 drives the steel ball 12 to move downwards, and then drives the cantilever beam 10 to bend downwards via the transmission screw 11. A positive bending strain is generated on an upper surface of the cantilever beam 10, and the first fiber Bragg grating (FBG1) 13 senses the bending strain, and the wavelength shows a forward drift. The wavelength shift amount $\Delta\lambda_1$ is subtracted with the wavelength shift amount $66\lambda_2$ of the second fiber Bragg grating (FBG2) (namely, subtracting the temperature-induced wavelength shift amount), and $\Delta\lambda_d = \Delta\lambda_1 - \Delta\lambda_2$ is used as the output signal of the whole sensor, namely, the wavelength shift amount output caused by displacement. By the same reasoning, when the displacement of the measured object is a negative displacement to the right, the circular slide groove 701 of the guider 7 drives the steel ball 12 to move upwards, and then the cantilever beam 10 is driven to bend upwards by the transmission screw 11. The upper surface of the cantilever beam 10 generates a negative bending strain, and the first fiber Bragg grating (FBG1) 13 senses the bending strain, and the wavelength shows a negative drift. Displacement values are applied to the sensor by using a precision spiral displacement stage, and the wavelength drift output $\Delta\lambda_d = \Delta\lambda_1 - \Delta\lambda_2$ corresponding to each displacement value is recorded using a fiber Bragg grating wavelength demodulator, and then the functional relationship between the external displacement value and the wavelength drift output can be obtained by function fitting, and the sensor is used to measure the unknown displacement, i.e. the specific value of the measured unknown displacement can be back-deduced according to the wavelength drift output caused by the unknown displacement and the functional relationship.

Figure 8:
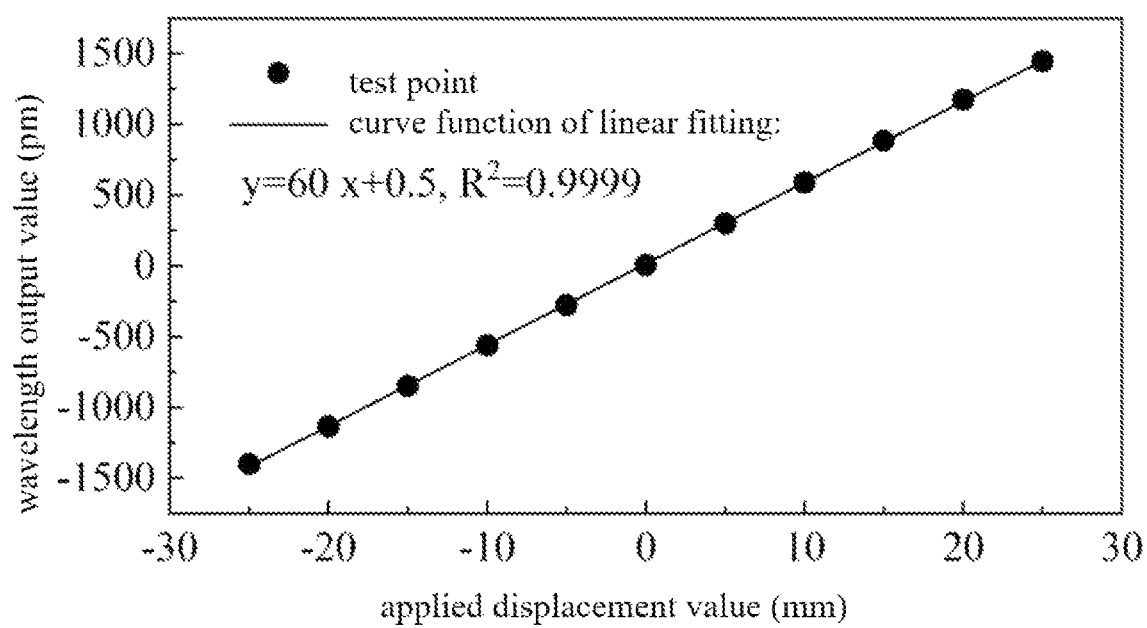
FIG. 8 is a schematic view showing a displacement as a function of wavelength output value for the test calibration of the present disclosure.

Calibration of the measurement function of the sensor is performed. The sensor is calibrated using a precision helical displacement stage, and the pin 6 is closely attached to the surface of the precision helical displacement stage, so that the pin 6 moves with the movement of the precision helical displacement stage. The displacement changes by 1 mm for each rotation of the hand wheel of the precision helical displacement stage. The measuring range of the device of the present disclosure depends on the length of the guider 7 and the limit positions of the left and right running spaces of the linear slide 9, and the measuring range of the present embodiment is taken as positive and negative 25 mm as an example. It is specified that the displacement of the spiral displacement stage makes the pin 6 pull out of the base 2 in the positive direction of the displacement, and makes the pin 6 retract into the base 2 in the negative direction of the displacement. All the pins 6 are pushed into the base 2, so that the sensor is at the position of −25 mm, starting from the value of −25 mm, taking the displacement of every 5 mm as a test point interval. The output wavelength data of the sensor is collected once for every five rotations of the hand wheel of the precision spiral displacement stage (corresponding to 5 mm), until the position of 25 mm is reached. As shown in FIG. 8, the corresponding diagram of applied displacement value and wavelength output value is drawn, linear fitting is performed, and the corresponding functional relationship between displacement and wavelength output value after fitting is obtained, so as to complete the calibration of this sensor. The calibrated sensor is taken to an occasion where displacement measurement is required, the base 2 of the sensor is fixed on a certain reference object, and the pin 6 is brought into contact with the measured object. When the measured object moves, the wavelength output value of the sensor changes, and a specific value of the movement of the measured object can be back-calculated by combining the corresponding functional relationship obtained through test and calibration.

The mechanical connection involved in the present disclosure is a customary means used by a person skilled in the art, and the technical inspiration can be obtained by way of a limited number of trials, and falls within common knowledge.

Components not described in detail herein are prior art.

What is claimed is:

1. A fiber Bragg grating displacement sensor with positive and negative bidirectional measurement and free from vibration, characterized by comprising: a cover plate (1), a base (2), a sleeve (3), a bidirectional measuring mechanism (16), a vibration-avoiding mechanism (17), a linear guide rail (8), a linear slider (9), a first fiber Bragg grating (13), a compensation strip (14) and a second fiber Bragg grating (15), the cover plate (1) being provided on a front side of the base (2), the sleeve (3) being provided on a left side of the base (2), the bidirectional measuring mechanism (16) being slidably connected in the base (2), the linear guide rail (8) being provided inside the base (2), the linear slider (9) being provided on the linear guide rail (8), the bidirectional measuring mechanism (16) being connected to the linear slider (9), characterized in that the bidirectional measuring mechanism (16) comprises a transmission rod (4), a spring (5), a pin (6) and a guider (7), the transmission rod (4) being provided inside the base (2), the transmission rod (4) passing through the sleeve (3), the pin (6) being connected to a left end of the transmission rod (4), the spring (5) being provided on an outer surface of the transmission rod (4) on a right side of the pin (6), and the guider (7) being connected to a right end of the transmission rod (4) inside the base (2), a vibration-avoiding mechanism (17) being provided inside the base (2) above the linear guide rail (8), characterized in that the vibration-avoiding mechanism (17) comprises a cantilever beam (10), a transmission screw (11) and a steel ball (12), the cantilever beam (10) being fixedly connected to an inner wall, above the linear guide rail (8), of the base (2), the transmission screw (11) being provided at one end of the cantilever beam (10), and a steel ball (12) being connected to a tail end, inside the guider (7), of the transmission screw (11), the first fiber Bragg grating (13) being pasted on the upper surface of the vibration-avoiding mechanism (17), the compensation strip (14) being fixedly connected a the left side of the inner top wall of the base (2), and the second fiber Bragg grating (15) being pasted on a lower surface of the compensation strip (14).

2. The fiber Bragg grating displacement sensor with positive and negative bidirectional measurement and free from vibration according to claim 1, characterized in that the cover plate (1) is in a rectangular plate shape, two rows of through holes are arranged in parallel on the front side of the cover plate (1), and each row of through holes consists of three through holes at equal intervals, the base (2) being in a shape of a rectangular box without a cover, a sleeve screw hole (201) being provided on a left side face of the base (2), a first boss (202), a second boss (203) and a third boss (204) being provided on an inner wall of the base (2), two screw holes being provided on the first boss (202), seven screw holes being provided on the second boss (203) at equal intervals, a first fiber outlet screw hole (205), a second fiber outlet screw hole (206) and two cantilever beam fixing through holes (207) being provided on a right side face of the base (2), the front side of the base (2) being provided with a through hole at a position corresponding to a position of the through hole on the front side of the cover plate (1): the sleeve (3) being a cylindrical structure with a shoulder, a right side of the sleeve (3) being in threaded connection with the sleeve screw hole (201), and the surface of the sleeve (3) being provided with a fastening screw hole (301).

3. The fiber Bragg grating displacement sensor with positive and negative bidirectional measurement and free from vibration according to claim 2, characterized in that the guider (7) is of a wedge-shaped structure, a circular slide groove (701), four guider fixing through holes (702) and a transmission rod fixing screw hole (703) being provided inside the guider (7), the circular slide groove (701) being provided in an inclined manner, the transmission rod (4) being in a threaded connection with the transmission rod fixing screw hole (703) via the external thread on the right side, the linear guide rail (8) being in a shape of an elongated strip, a through hole corresponding to seven screw holes on the second boss (203) being provided on the linear guide rail (8), and the linear guide rail (8) being fixed on the second boss (203) via a screw.

4. The fiber Bragg grating displacement sensor with positive and negative bidirectional measurement and free from vibration according to claim 3, characterized in that the linear slider (9) comprises a first linear slider (901) and a second linear slider (902) with same structure slidingly connected on the linear guide rail (8), surfaces of the first linear slider (901) and second linear slider (902) being both provided with two screw holes, positions of the screw holes corresponding to positions of four guider fixing through holes (702), the guider (7) being fixed on the linear slider (9) by means of a screw, a left side of the cantilever beam (10) being provided with an end screw hole (1001), a right side of the cantilever beam (10) being provided with two root screw holes (1002), the right side of the cantilever beam (10) being partially placed on the third boss (204), positions of the two root screw holes (1002) corresponding to positions of the two cantilever beam fixing through holes (207), and the cantilever beam (10) being fixed in the base (2) by two screws.

5. The fiber Bragg grating displacement sensor with positive and negative bidirectional measurement and free from vibration according to claim 4, characterized in that the transmission screw (11) is in threaded connection with the end screw hole (1001), the steel ball (12) being a round ball with a smooth surface, a screw hole being provided on a surface of the steel ball (12), the steel ball (12) being in threaded connection with the transmission screw (11) via the screw hole, the steel ball (12) being embedded in the circular slide groove (701), and the steel ball (12) being slidably connected with the circular slide groove (701), and the steel ball (12) being located in the middle of the circular slide groove (701).

6. The fiber Bragg grating displacement sensor with positive and negative bidirectional measurement and free from vibration according to claim 5, characterized in that the compensation strip (14) is provided with a through hole at a position corresponding to the positions of two screw holes on the first boss (202), and the compensation strip (14) is fixedly connected to the first boss (202) via two screws, the first fiber Bragg grating (13) and the second fiber Bragg grating (15) being connected in series with the same fiber, and two ends of the fiber respectively exiting through a first fiber outlet screw hole (205) and a second fiber outlet screw hole (206).

7. The fiber Bragg grating displacement sensor with positive and negative bidirectional measurement and free from vibration according to claim 1, characterized in that the transmission rod (4) is of a rod-shaped structure, a left side of the transmission rod (4) being provided with an internal thread, and a right side of the transmission rod (4) being provided with an external thread, the spring (5) being sheathed on the transmission rod (4), a right side of the strina (5) abutting a left side of the sleeve (3), the vin (6) having a conical structure, a left side of the pin (6) having a spherical shape, the pin (6) being in threaded connection with the transmission rod (4), and a right side of the pin (6) abutting a left side of the spring (5).

* * * * *